(12) United States Patent
Fryer

(10) Patent No.: US 6,283,219 B1
(45) Date of Patent: Sep. 4, 2001

(54) METHOD OF TREATMENT FOR FOUNDER AND LAMINITIS IN THE EQUINE HOOF

(76) Inventor: David Thomas Fryer, 240 W. Race St., Fleetwood, PA (US) 19522

(*) Notice: Subject to any disclaimer, the term of this patent is extended or adjusted under 35 U.S.C. 154(b) by 0 days.

(21) Appl. No.: 09/411,272

(22) Filed: Oct. 4, 1999

(51) Int. Cl.[7] ........................ A01L 7/00
(52) U.S. Cl. ........................ 168/26; 168/14
(58) Field of Search ................ 168/12, 14, 26, 168/27

(56) References Cited

U.S. PATENT DOCUMENTS

| | | | |
|---|---|---|---|
| 356,294 | * | 1/1887 | Shiers ........................ 168/26 |
| 362,215 | * | 5/1887 | Hipp ........................ 168/26 |
| 914,003 | * | 3/1909 | Woolverton ........................ 168/26 |
| 4,794,991 | * | 1/1989 | Honderich ........................ 168/26 |
| 5,289,878 | * | 3/1994 | Landi et al. ........................ 168/14 |
| 5,509,484 | * | 4/1996 | Landi et al. ........................ 168/14 |

* cited by examiner

Primary Examiner—Charles T. Jordan
Assistant Examiner—Elizabeth Shaw

(57) ABSTRACT

Described is a plastic form conforming to the shape of the underside of an equine hoof and within the borders of the hoof wall that is affixed to the hoof by means of straps or adhesive tape. The function of the form is to support the sole and skeletal structure of the hoof while the hoof wall remains unsupported, the purpose being to allow the hoof wall to grow out undistorted following the occurrence of lamninitis or founder. The plastic form can have additional thickness at the heel area to reduce tension of the suspensor ligaments and flexor tendons. The form can be cushioned to allow for sensitive hoof soles.

3 Claims, 1 Drawing Sheet

METHOD OF TREATMENT FOR FOUNDER AND LAMINITIS IN THE EQUINE HOOF

BACKGROUND OF THE INVENTION

1. Field of the Invention

This invention relates in general to farriery, and in particular to the treatment of the equine diseases of founder and laminitis.

2. Description of Prior Art

Founder or laminitis in equines is a disease where the hoof wall separates from the underlying skeletal structure, referred to either as the coffin bone or the third phalanx. This occurs due to inflammation and deterioration of the laminae which holds the hoof wall to the third phalanx. The weight of the equine causes the coffin bone to rotate downward and the hoof wall to deform forward. Typically the equine will shift the distribution of weight onto the heels, which causes the flexor tendons to pull the coffin bone more, increasing and perpetuating the damage. Previous treatment of this problem comprised nailing corrective shoes to the hoof and, later adding therapeutic pads between hoof and shoe. Traditional types of shoes such as bar shoes, heartbar shoes or reversed shoes have been used. Therapeutic shoes are relatively new.

A horseshoe with a base within which filler could be added for support was described by Stubbe (U.S. Pat. No. 4,237,981). Murphy (U.S. Pat. No. 4,513,825), McKibbin (U.S. Pat. No. 4,605,071), Landi, et. al. (U.S. Pat. No. 5,509,484), and Colonel, et. al. (U.S. Pat. No. 4,823,883). All these described nail-on horseshoes with pads to absorb shock and for use in the treatment of lameness. Foster (U.S. Pat. No. 5,711,377) and Ovnicek (U.S. Pat. No. 5,727,633) both describe therapeutic pads with elevated heels used with horseshoes. The problems with these therapies is that they all use deflective cushions which don't provide solid support, and they all use horseshoes which are fastened to and support the hoof wall allowing continued deformation.

Several therapeutic horseshoes were described. Ovnicek (U.S. Pat. No. 5,727,633) described a horseshoe for treatment of lameness, however it avoids contact with the coffin bone. Hendrick (U.S. Pat. No. 4,794,991) used a concave shaped plate attached to a horseshoe while Mercer II (U.S. Pat. No. 4,422,509) used a horseshoe with an adjustable pin located under the coffin bone to pressure the coffin bone back into a normal position. While their concept is somewhat feasible, they do nothing to correct the deformation of the hoof wall. Brooks (U.S. Pat. No. 5,546,735) describes a horse hoof sandal with a triangular pad for frog support. This at least does not inhibit normal growth of the hoof wall, but uses a deflective pad placed on the frog rather than the coffin bone.

The use of a non-deflective support material was described by Techen, et. al. (U.S. Pat. No. 4,899,824) who injected the material between the hoof and a screen with a horseshoe for hoof sole support. Again, the horseshoe, being nailed to the hoofwall, prevents normal hoof wall growth Knudsen (U.S. Pat. No. 5,199,498) used a thermalplastic, polycaprolactone polymer, for hoof repair and as a moldable hoof pad. Beadle (U.S. Pat. No. 5,706,898) describes using a thermoplastic material on the frog of the hoof for treatment of laminitis. However, as their process has the equine stand on the unhardened material, the material flattens out allowing the hoof wall to contact the ground surface. No support remains for the anterior tip of the coffin bone, which is in front of the frog and behind the anterior hoof wall.

A common veterinarian surgical procedure for founder is to debride or remove the distorted hoof wall up to the area where the laminae are still intact. This allows the hoof wall to grow out without pressure from the ground surface. This procedure has the same mechanical objective as the present invention. However the surgical method opens the affected member to infection while necessitating daily cleaning and bandaging.

These applications, while contributing to the treatment of laminitis, all fall short of the necessary combination of the treatment principles. The anterior portion of the coffin bone of the hoof must be supported by a non-deflective, rigid surface while the hoof wall remains unsupported so that it can grow out without the horse's weight causing further deformation. Also, the toe-heel angle of the hoof should be raised to alleviate the tension of the tendons attached to the coffin bone, which otherwise would maintain the downward rotation caused by founder.

BRIEF SUMMARY OF THE INVENTION

The principle object of the invention is to fabricate and attach a plastic form conforming to the bottom of the equine's hoof that will support the sole and skeletal structure of the hoof while leaving the hoof wall unsupported. This will allow the deformed hoof wall to grow and be trimmed without continued deformation by the pressure of the equine's weight. It is also the object of the invention that the form raise the angle of the heel of the hoof, thereby reducing tension on the tendons attached to the coffin bone. This would help allow the coffin bone to return to its normal position.

Another object of the invention is to fabricate a form of such durability and functionality as to be able to be easily removed and reinstalled. As this treatment of founder can take as long as six months to a year, the form must periodically be removed to allow cleaning of the form and the hoof sole, and trimming of the hoof wall. The form is then easily reinstalled.

DETAILED DESCRIPTION OF THE PREFERRED EMBODIMENT OF THE INVENTION

Figure 2:
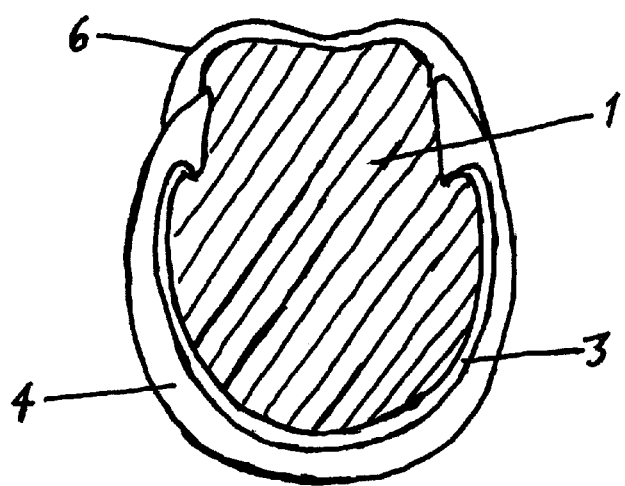
FIG. 2 is a plan view of the hoof showing the position of the form (1) inside the perimeter of the laminae (3) and hoof wall (4). Number 6 is the bulbs of the heel.

The underside of an equine hoof is in a U shape as shown in FIG. 2. The shape of the hoof wall (4) normally conforms to the shape of the coffin bone (2). Normally the lamina (3) joining the two is of even thickness about a quarter inch wide the entire perimeter. When an equine hoof founders, the laminae (3) in front widen as the hoof wall separates from the coffin bone (2). In order for the hoof to be allowed to grow back normally, the coffin bone(2) must be supported while the hoof wall (4) remains unsupported.

The treatment method of the invention requires that a plastic form (1) be molded to the underside of the sole of the hoof inside the laminae or white line (FIG. 2, number 3), and the hoof wall (FIG. 2, number 4). The form (1) itself should not adhere to the sole, but should be capable of being removed for cleaning and reinstallation. The hoof wall (4) can then be kept trimmed so as not to contact the ground surface.

Figure 1:
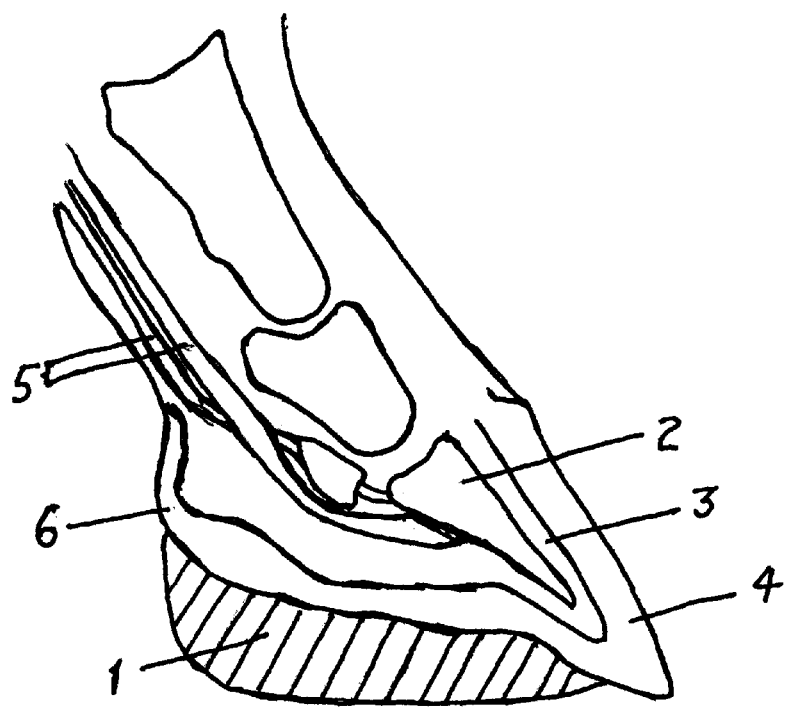
FIG. 1 is a cross-section of an equine hoof showing the preferred disclosure of the applicant's invention. Number 1 is the form in position on the dorsal region of the hoof. Number 2 is the distal phalanx or coffin bone. Number 3 is the laminae or white line. Number 4 is the hoof wall. Number 5 the flexor tendons, both superficial and deep. Number 6 is the bulbs of the heel which are above the rear of the form.

The preferred material for the invention is a formable plastic, such as polycaprolactone, which is capable of conforming exactly to the sole of that particular hoof, as each hoof has an individual conformation, and must be evenly supported. The polycaprolactone is heated to at least 140 degrees Fahrenheit until it becomes a clear gel. The equine's hoof is held inverted and cleaned. A mold release agent such as a medicated petroleum gel can be applied to the sole surface to facilitate removing the form. The polycaprolactone moldable gel is then pressed into the underside of the equine hoof so that the contacting surface conforms to the shape of the sole. The opposing surface of the moldable gel is formed into a flattened convex lens shape with a greater thickness at the heel end (see FIG. 1, number 1). When the form (1) has cooled and hardened enough to enable removal without deformation, the form (1) is removed from the hoof to finish hardening. When hardened, the form (1) can be fitted with straps for mounting on the hoof, if desired. The form (1) can then be installed to the underside of the hoof with the straps or it can be held in place with an adhesive tape or a combination of methods of affixing the form (1) to the hoof can be used. For equines which have sensitive or damaged soles and are unable to withstand a hard rigid surface, a layer of cushioning material such as silicone can be added on the sole contacting surface of the form (1).

While the above description contains detailed specifications and instructions, these should not be construed as limitations on the scope of the invention, but rather as an exemplification of one preferred embodiment thereof. Many other variations are possible, such as different formulations or different methods of application such as aerosol spray. Accordingly, the scope of the invention should be determined not by the embodiment illustrated, but by the appended claims and their legal equivalents.

What is claimed is:

1. a plastic form affixed to the underside of an equine hoof conforming to the shape of the underside of the hoof and within the inner border of the hoof wall so as to support the equine limb while suspending the hoof wall.

2. the plastic form of claim 1 wherein the form has additional thickness at the heel area of the hoof to elevate the heels.

3. the plastic form of claim 1 wherein the sole contacting surface of the form is cushioned.

* * * * *